United States Patent
Terry (10) Patent No.: US 10,798,680 B2
(45) Date of Patent: *Oct. 6, 2020

(54) POINT TO MULTI-POINT SERVICES USING HIGH SPEED SHARED CHANNELS IN WIRELESS COMMUNICATION SYSTEMS

(71) Applicant: INTERDIGITAL TECHNOLOGY CORPORATION, Wilmington, DE (US)

(72) Inventor: Stephen E. Terry, Northport, NY (US)

(73) Assignee: INTERDIGITAL TECHNOLOGY CORPORATION, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/025,464

(22) Filed: Jul. 2, 2018

(65) Prior Publication Data

US 2018/0310278 A1    Oct. 25, 2018

Related U.S. Application Data

(63) Continuation of application No. 15/207,000, filed on Jul. 11, 2016, now Pat. No. 10,015,775, which is a
(Continued)

(51) Int. Cl.
*H04W 72/00* (2009.01)
*H04W 48/12* (2009.01)
(Continued)

(52) U.S. Cl.
CPC ......... *H04W 72/005* (2013.01); *H04L 1/0041* (2013.01); *H04L 1/20* (2013.01);
(Continued)

(58) Field of Classification Search
None
See application file for complete search history.

(56) References Cited

U.S. PATENT DOCUMENTS 2,845,393 A    7/1958    Varvel
5,418,937 A    5/1995    Inoue
(Continued)

FOREIGN PATENT DOCUMENTS

EP    0 944 275    9/1999
EP    1 006 740    6/2000
(Continued)

OTHER PUBLICATIONS

3GPP TSG RAN WG1, "Response to Liaison Statement R4-020519 on HSDPA Open Issues," TSG-RAN Working Group 1 Meeting #24, R1-2-0479 (Feb. 18-22, 2002).
(Continued)

*Primary Examiner* — Eunsook Choi
(74) *Attorney, Agent, or Firm* — Volpe and Koenig, P.C.

(57) ABSTRACT

Service data is transferred in a wireless communication system. A first service identification is transmitted for reception by a group of users of a cell in the system. The group of users does not include all of the users of the cell. Each of the group of users receives the service identification. Each of the group of users monitors for a second service identification being transmitted over a high speed downlink shared channel (HS-DSCH). The service data is transmitted over the HS-DSCH with the second service identification. Each of the group of users detects the second service identification and receives the service data of the HS-DSCH.

12 Claims, 4 Drawing Sheets

Related U.S. Application Data continuation of application No. 14/711,440, filed on May 13, 2015, now abandoned, which is a continuation of application No. 10/426,191, filed on Apr. 30, 2003, now abandoned.

(60) Provisional application No. 60/377,036, filed on May 1, 2002.

(51) Int. Cl.

| | | |
|---|---|---|
| *H04L 1/20* | (2006.01) | |
| *H04W 4/06* | (2009.01) | |
| *H04L 1/00* | (2006.01) | |
| *H04W 4/08* | (2009.01) | |
| *H04L 1/18* | (2006.01) | |
| *H04W 72/04* | (2009.01) | |
| *H04W 72/12* | (2009.01) | |

(52) U.S. Cl.
CPC ............... *H04W 4/06* (2013.01); *H04W 4/08* (2013.01); *H04W 48/12* (2013.01); *H04L 1/0003* (2013.01); *H04L 1/0026* (2013.01); *H04L 1/1819* (2013.01); *H04L 2001/0093* (2013.01); *H04W 72/04* (2013.01); *H04W 72/1236* (2013.01)

(56) References Cited

U.S. PATENT DOCUMENTS

| | | | |
|---|---|---|---|
| 5,570,366 A | 10/1996 | Baker et al. | |
| 5,648,961 A | 7/1997 | Ebihara | |
| 5,655,219 A * | 8/1997 | Jusa | H04W 12/06 455/338 |
| 5,761,619 A | 6/1998 | Danne et al. | |
| 5,887,252 A | 3/1999 | Noneman | |
| 5,940,756 A | 8/1999 | Sibecas et al. | |
| 5,978,368 A | 11/1999 | Hjelm et al. | |
| 6,031,490 A | 2/2000 | Mazur et al. | |
| 6,122,483 A | 9/2000 | Lo et al. | |
| 6,144,711 A | 11/2000 | Raleigh et al. | |
| 6,188,911 B1 | 2/2001 | Wallentin et al. | |
| 6,308,079 B1 | 10/2001 | Pan et al. | |
| 6,347,234 B1 | 2/2002 | Scherzer | |
| 6,349,210 B1 | 2/2002 | Li | |
| 6,385,461 B1 | 5/2002 | Raith | |
| 6,392,572 B1 | 5/2002 | Shiu et al. | |
| 6,529,740 B1 | 3/2003 | Ganucheau et al. | |
| 6,549,317 B1 | 4/2003 | Jung et al. | |
| 6,621,805 B1 | 9/2003 | Kondylis et al. | |
| 6,650,649 B1 | 11/2003 | Muhammad et al. | |
| 6,738,640 B1 | 5/2004 | Baker et al. | |
| 6,804,528 B1 * | 10/2004 | Laroia | H04L 12/189 455/503 |
| 6,855,401 B2 | 2/2005 | Feldmen et al. | |
| 6,950,684 B2 | 9/2005 | Goldberg | |
| 6,954,136 B2 | 10/2005 | Sauer | |
| 6,965,579 B1 * | 11/2005 | Shin | H04L 12/1877 370/312 |
| 6,965,580 B1 | 11/2005 | Takagi et al. | |
| 6,996,061 B2 | 2/2006 | Yang et al. | |
| 7,006,484 B2 | 2/2006 | Hayama et al. | |
| 7,092,367 B2 | 8/2006 | Kawai et al. | |
| 7,116,983 B2 | 10/2006 | Lan et al. | |
| 7,206,291 B2 | 4/2007 | Soldani et al. | |
| 7,218,663 B1 | 5/2007 | Yokota et al. | |
| 7,227,850 B2 | 6/2007 | Dahlman et al. | |
| 7,245,595 B2 | 7/2007 | Kim et al. | |
| 7,292,854 B2 | 11/2007 | Das et al. | |
| 7,310,336 B2 * | 12/2007 | Malkamaki | H04L 1/0083 370/349 |
| 7,366,133 B1 | 4/2008 | Majidi-Ahy et al. | |
| 2001/0016497 A1 | 8/2001 | Al-Housami | |
| 2001/0022784 A1 | 9/2001 | Menon et al. | |
| 2001/0030956 A1 | 10/2001 | Chillariga et al. | |
| 2001/0033581 A1 | 10/2001 | Kawarai et al. | |
| 2001/0046220 A1 | 11/2001 | Koo et al. | |
| 2001/0046877 A1 | 11/2001 | Ohkubo et al. | |
| 2002/0009061 A1 | 1/2002 | Willenegger | |
| 2002/0010001 A1 | 1/2002 | Dahlman et al. | |
| 2002/0037736 A1 | 3/2002 | Kawaguchi et al. | |
| 2002/0071415 A1 | 6/2002 | Soualabail et al. | |
| 2002/0075822 A1 | 6/2002 | Costa et al. | |
| 2002/0102967 A1 | 8/2002 | Chang et al. | |
| 2002/0106985 A1 | 8/2002 | Sato et al. | |
| 2002/0115466 A1 | 8/2002 | Kanemoto et al. | |
| 2002/0119717 A1 | 8/2002 | Taylor, Jr. et al. | |
| 2002/0136193 A1 | 9/2002 | Chang et al. | |
| 2002/0141331 A1 | 10/2002 | Mate et al. | |
| 2002/0181423 A1 * | 12/2002 | Chen | H04L 69/164 370/337 |
| 2003/0035423 A1 | 2/2003 | Beckmann et al. | |
| 2003/0039232 A1 | 2/2003 | Casati et al. | |
| 2003/0054807 A1 * | 3/2003 | Hsu | H04M 3/4872 455/414.1 |
| 2003/0095605 A1 | 5/2003 | Das et al. | |
| 2003/0100325 A1 | 5/2003 | Paila et al. | |
| 2003/0112778 A1 * | 6/2003 | Lundby | H04W 72/085 370/335 |
| 2003/0123382 A1 | 7/2003 | Wang et al. | |
| 2003/0134622 A1 | 7/2003 | Hsu et al. | |
| 2003/0137401 A1 | 7/2003 | Sauer | |
| 2003/0157949 A1 * | 8/2003 | Sarkkinen | H04L 12/189 455/503 |
| 2003/0176192 A1 | 9/2003 | Morimoto et al. | |
| 2003/0192004 A1 * | 10/2003 | Gopalakrishnan | H04L 1/0061 714/758 |
| 2003/0220119 A1 | 11/2003 | Terry et al. | |
| 2003/0228865 A1 | 12/2003 | Terry et al. | |
| 2004/0014429 A1 | 1/2004 | Guo | |
| 2004/0190525 A1 | 9/2004 | Lepisaari et al. | |
| 2005/0203990 A1 | 9/2005 | Weksel | |
| 2005/0212659 A1 | 9/2005 | Sauer | |
| 2006/0056341 A1 * | 3/2006 | Takagi | H04B 7/26 370/328 |
| 2009/0103514 A1 | 4/2009 | Hwang et al. | |

FOREIGN PATENT DOCUMENTS

| | | |
|---|---|---|
| EP | 1 077 539 | 2/2001 |
| EP | 1 161 004 | 12/2001 |
| EP | 1 517 573 | 9/2005 |
| JP | 11-032370 | 2/1999 |
| JP | 11-196041 | 7/1999 |
| JP | 2001-053675 | 2/2001 |
| JP | 2001-308784 | 11/2001 |
| JP | 2002-051006 | 2/2002 |
| JP | 2002-064878 | 2/2002 |
| WO | 99/08457 | 2/1999 |
| WO | 99/11032 | 3/1999 |
| WO | 99/14870 | 3/1999 |
| WO | 99/44376 | 9/1999 |
| WO | 99/52304 | 10/1999 |
| WO | 00/30375 | 5/2000 |
| WO | 00/62547 | 10/2000 |
| WO | 01/22234 | 3/2001 |
| WO | 02/01893 | 1/2002 |
| WO | 02/028046 | 4/2002 |
| WO | 02/32017 | 4/2002 |
| WO | 04/051873 | 6/2004 |

OTHER PUBLICATIONS

3GPP TSG RAN WG4, "Liaison Statement on HSDPA open issues," TSG-RAN Working Group 4 (Radio) meeting #21, R4-020519 (Jan. 28-Feb. 1, 2002).

Eyceoz et al., "Adaptive Prediction, Tracking and Power Adjustment for Frequency Non-Selective Fast Fading Channels," Communication Theory Mini-Conference, pp. 6-10 (Sep. 2000).

Frodigh et al., "Future-Generation Wireless Networks," IEEE Personal Communications, vol. 8, No. 5 (Oct. 2001).

(56) References Cited

OTHER PUBLICATIONS

Holma et al., "WCDMA for UMTS: Radio Access for Third Generation Mobile Communications," Revised Edition, Wiley (Mar. 7, 2001).
IEEE Standard for Local and metropolitan area networks Part 16: Air Interface for Fixed Broadband Wireless Access Systems, IEEE Std. 802.16-2001 (Apr. 8, 2002).
Kohno et al., "Evolution and Demands of SoC in ITS and Mobile Communication Systems," Proceedings of the International Symposium on Semiconductor Manufacturing, pp. 1-5 (Jun. 1999).
LG Electronics, "Use of DSCH for MBMS Multicast Mode," TSG-RAN Working Group 2 Meeting #32, R2-022573 (Sep. 23-27, 2002).
Motorola, "Timing Relationship to support HSDPA Operation," TSG-RAN Working Group 1#23, R1-01-1243, Jeju, Korea, (Nov. 19-23, 2001).
Motorola, "Proposed CR 001 to TS25.308 [REL-5] on Update to HSDPA Stage 2," 3GPP TSG-RAN WG2 Meeting #25, R2-012753 (Nov. 26-30, 2001).
Nokia, "HSDPA Timing Relations," 3GPP TSG-RAN WG1 HSDPA AdHoc, R1-01-1021, Sophia Antipolis, France (Nov. 5-7, 2001).
Sawahashi et al., "High-Speed Packet Wireless Access in W-CDMA and its Radio Link performance," Transactions of the Institute of Electronics, Information, and Communication Engineers, vol. J84-B, No. 10, pp. 1725-1745 (Oct. 2001). X**.
Siemens, "Discussion of requirements of a MBMS transport channel," TSG-RAN WG2 meeting #28, R2-020732 (Apr. 8-12, 2002).
Third Generation Partnership Project, "Technical Specification Group Radio Access Network; MAC Protocol Specification (Release 1999)," 3GPP TS 25.321 v3.11.0 (Mar. 2002).
Third Generation Partnership Project, "Technical Specification Group Radio Access Network; MAC Protocol Specification (Release 1999)," 3GPP TS 25.321 v3.15.0 (Mar. 2003).
Third Generation Partnership Project, "Technical Specification Group Radio Access Network; MAC Protocol Specification (Release 4)," 3GPP TS 25.321 v4.4.0 (Mar. 2002).
Third Generation Partnership Project, "Technical Specification Group Radio Access Network; MAC Protocol Specification (Release 4)," 3GPP TS 25.321 v4.8.0 (Mar. 2003).
Third Generation Partnership Project, "Technical Specification Group Radio Access Network; MAC Protocol Specification (Release 5)," 3GPP TS 25.321 v5.0.0 (Mar. 2002).
Third Generation Partnership Project, "Technical Specification Group Radio Access Network; MAC Protocol Specification (Release 5)," 3GPP TS 25.321 v5.4.0 (Mar. 2003).
Third Generation Partnership Project, "Technical Specification Group Radio Access Network; High Speed Downlink Packet Access (HSDPA); Overall Description; Stage 2 (Release 5)," 3GPP TS 25.308 V5.2.0 (Mar. 2002).
Third Generation Partnership Project, "Technical Specification Group Radio Access Network; High Speed Downlink Packet Access (HSDPA); Overall Description; Stage 2 (Release 5)," 3GPP TS 25.308 V5.4.0 (Mar. 2003).
Third Generation Partnership Project, "Technical Specification Group GSM/EDGE Radio Access Network; Mobile Station—Base Station System (MS-BSS) interface; Channel structures and access capabilities (Release 4)," 3GPP TS 44.003 V4.0.0 (Apr. 2001).
Third Generation Partnership Project, "Technical Specification Group GSM/EDGE Radio Access Network; Mobile Station—Base Station System (MS-BSS) interface; Channel structures and access capabilities (Release 5)," 3GPP TS 44.003 V5.0.1 (Dec. 2002).
Third Generation Partnership Project, "Technical Specification Group GERAN; Digital cellular telecommunications system (Phase 2+); General Packet Radio Service (GPRS); Overall description of the GPRS radio interface; Stage 2 (Release 4)," 3GPP TS 43.064 V4.3.0 (Dec. 2002).
Third Generation Partnership Project, "Technical Specification Group GERAN; Digital cellular telecommunications system (Phase 2+); General Packet Radio Service (GPRS); Overall description of the GPRS radio interface; Stage 2 (Release 4)," 3GPP TS 43.064 V4.4.0 (Apr. 2003).
Third Generation Partnership Project, "Technical Specification Group GERAN; Digital cellular telecommunications system (Phase 2+); General Packet Radio Service (GPRS); Overall description of the GPRS radio interface; Stage 2 (Release 5)," 3GPP TS 43.064 V5.1.0 (Dec. 2002).
Third Generation Partnership Project, "Technical Specification Group Services and System Aspects; Multimedia Broadcast/Multicast Service; Stage 1 (Release 6)," 3GPP TS 22.146 V6.2.0 (Mar. 2003).
Third Generation Partnership Project, "Technical Specification Group Services and System Aspects; Multimedia Broadcast/Multicast Service; Stage 1 (Release 5)," 3GPP TS 22.146 V5.2.0 (Mar. 2002).
Third Generation Partnership Project, "Technical Specification Group Core Network; Mobile radio interface Layer 3 specification; Core network protocols; Stage 3 (Release 4)," 3GPP TS 24.008 V4.6.0 (Mar. 2002).
Third Generation Partnership Project, "Technical Specification Group Core Network; Mobile radio interface Layer 3 specification; Core network protocols; Stage 3 (Release 1999)," 3GPP TS 24.008 V3.11.0 (Mar. 2002).
Third Generation Partnership Project, "Technical Specification Group Core Network; Mobile radio interface Layer 3 specification; Core network protocols; Stage 3 (Release 1999)," 3GPP TS 24.008 V3.15.0 (Mar. 2003).
Third Generation Partnership Project, "Technical Specification Group Core Network; Mobile radio interface Layer 3 specification; Core network protocols; Stage 3 (Release 4)," 3GPP TS 24.008 V4.10.0 (Mar. 2003).
Third Generation Partnership Project, "Technical Specification Group Core Network; Mobile radio interface Layer 3 specification; Core network protocols; Stage 3 (Release 5)," 3GPP TS 24.008 V5.7.0 (Mar. 2003).
Third Generation Partnership Project, "Technical Specification Group Core Network; Mobile radio interface Layer 3 specification; Core network protocols; Stage 3 (Release 5)," 3GPP TS 24.008 V5.3.0 (Mar. 2002).
Third Generation Partnership Project, "Technical Specification Group Core Network; Mobile radio interface Layer 3 specification; Core network protocols; Stage 3 (Release 6)," 3GPP TS 24.008 V6.0.0 (Mar. 2003).
Third Generation Partnership Project, "Technical Specification Group GSM/EDGE Radio Access Network; Multiplexing and multiple access on the radio path (Release 4)," 3GPP TS45.002 V4.7.0 (Apr. 2003).
Third Generation Partnership Project, "Technical Specification Group GSM/EDGE Radio Access Network; Multiplexing and multiple access on the radio path (Release 4)," 3GPP TS45.002 V4.5.0 (Nov. 2001).
Third Generation Partnership Project, "Technical Specification Group GSM/EDGE Radio Access Network; Multiplexing and multiple access on the radio path (Release 5)," 3GPP TS45.002 V5.9.0 (Apr. 2003).
Third Generation Partnership Project, "Technical Specification Group GSM/EDGE Radio Access Network; Multiplexing and multiple access on the radio path (Release 5)," 3GPP TS45.002 V5.4.0 (Feb. 2002).
Third Generation Partnership Project, "Technical Specification Group GSM/EDGE Radio Access Network; Multiplexing and multiple access on the radio path (Release 6)," 3GPP TS45.002 V6.1.0 (Apr. 2003).
Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 4)," 3GPP TS 48.018 V4.5.0 (May 2002).
Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 4)," 3GPP TS 48.018 V4.4.0 (Sep. 2001).

(56) References Cited

OTHER PUBLICATIONS

Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 5)," 3GPP TS 48.018 V5.6.1 (Apr. 2003).

Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 6)," 3GPP TS 48.018 V6.1.0 (Apr. 2003).

Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 5)," 3GPP TS 48.018 V5.1.0 (Dec. 2001).

Third Generation Partnership Project, "Technical Specification Group Services and System Aspects; Vocabulary for 3GPP Specifications (Release 1999)," 3G TR 21.905 V3.3.0 (Oct. 2001).

Third Generation Partnership Project, "Technical Specification Group Services and System Aspects; Vocabulary for 3GPP Specifications (Release 4)," 3G TR 21.905 V4.4.0 (Oct. 2001).

Third Generation Partnership Project, "Technical Specification Group Services and System Aspects; Vocabulary for 3GPP Specifications (Release 5)," 3G TR 21.905 V5.3.0 (Mar. 2002).

Third Generation Partnership Project, "Technical Specification Group Services and System Aspects; Vocabulary for 3GPP Specifications (Release 5)," 3G TR 21.905 V5.6.0 (Mar. 2003).

Third Generation Partnership Project, "Technical Specification Group Services and System Aspects; Vocabulary for 3GPP Specifications (Release 6)," 3G TR 21.905 V6.2.0 (Mar. 2003).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.5.0 (Feb. 2002).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.11.0 (Apr. 2003).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.0.0 (Feb. 2002).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.6.0 (Apr. 2003).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6)," 3GPP TS 44.060 V6.2.0 (Apr. 2003).

Third Generation Partnership Project, "Technical Specification Group GSM/EDGE Radio Access Network; Mobile radio interface layer 3 specification; Radio Resource Control Protocol (Release 4)," 3GPP TS44.018 V4.8.0 (Feb. 2002).

Third Generation Partnership Project, "Technical Specification Group GSM/EDGE Radio Access Network; Mobile radio interface layer 3 specification; Radio Resource Control Protocol (Release 4)," 3GPP TS44.018 V4.14 (Apr. 2003).

Third Generation Partnership Project, "Technical Specification Group GSM/EDGE Radio Access Network; Mobile radio interface layer 3 specification; Radio Resource Control Protocol (Release 5)," 3GPP TS44.018 V5.4.0 (Feb. 2002).

Third Generation Partnership Project, "Technical Specification Group GSM/EDGE Radio Access Network; Mobile radio interface layer 3 specification; Radio Resource Control Protocol (Release 5)," 3GPP TS44.018 V5.10.0 (Apr. 2003).

Third Generation Partnership Project, "Technical Specification Group GSM/EDGE Radio Access Network; Mobile radio interface layer 3 specification; Radio Resource Control Protocol (Release 6)," 3GPP TS44.018 V6.2.0 (Apr. 2003).

Third Generation Partnership Project, "Technical Specification Group GSM/EDGE Radio Access Network; Layer 1; General requirements (Release 4)," 3GPP TS 44.004 V4.2.0 (Dec. 2001).

Third Generation Partnership Project, "Technical Specification Group GSM/EDGE Radio Access Network; Layer 1; General requirements (Release 5)," 3GPP TS 44.004 V5.1.0 (Jan. 2002).

Third Generation Partnership Project, "Technical Specification Group GSM/EDGE Radio Access Network; Layer 1; General requirements (Release 5)," 3GPP TS 44.004 V5.2.0 (Feb. 2002).

Third Generation Partnership Project, "Technical Specification Group Radio Access Network; Physical layer procedures (FDD) (Release 1999)," 3GPP TS 25.214 V3.10.0 (Mar. 2002).

Third Generation Partnership Project, "Technical Specification Group Radio Access Network; Physical layer procedures (FDD) (Release 4)," 3GPP TS 25.214 V4.4.0 (Mar. 2002).

Third Generation Partnership Project, "Technical Specification Group Radio Access Network; Physical layer procedures (FDD) (Release 5)," 3GPP TS 25.214 V5.0.0 (Mar. 2002).

Third Generation Partnership Project, "Technical Specification Group Radio Access Network; Physical channels and mapping of transport channels onto physical channels (FDD) (Release 1999)," 3GPP TS 25.211 V3.10.0 (Mar. 2002).

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Radio Resource Control (RRC); Protocol Specification (Release 5)," 3GPP TS 25.331 V5.4.0 (Mar. 2003).

Third Generation Partnership Project, "Technical Specification Group Radio Access Network; Radio Resource Control (RRC); Protocol Specification (Release 5)," 3GPP TS 25.331 V5.0.0 (Mar. 2002).

Third Generation Partnership Project, "Technical Specification Group Radio Access Network; Radio Resource Control (RRC); Protocol Specification (Release 4)," 3GPP TS 25.331 V4.9.0 (Mar. 2003).

Third Generation Partnership Project, "Technical Specification Group Radio Access Network; Radio Resource Control (RRC); Protocol Specification (Release 4)," 3GPP TS 25.331 V4.4.0 (Mar. 2002).

Third Generation Partnership Project, "Technical Specification Group Radio Access Network; Radio Resource Control (RRC) protocol specification (Release 1999)," 3GPP TS 25.331 V3.14.0 (Mar. 2003).

Third Generation Partnership Project, "Technical Specification Group Radio Access Network; Radio Resource Control (RRC); Protocol Specification (Release 1999)," 3GPP TS 25.331 V3.10.0 (Mar. 2002).

Third Generation Partnership Project, "Technical Specification Group Radio Access Network; UE Procedures in Idle Mode and Procedures for Cell Reselection in Connected Mode (Release 5)," 3GPP TS 25.304 V5.2.0 (Dec. 2002).

Third Generation Partnership Project, "Technical Specification Group Radio Access Network; UE Procedures in Idle Mode and Procedures for Cell Reselection in Connected Mode (Release 5)," 3GPP TS 25.304 V5.0.0 (Mar. 2002).

Third Generation Partnership Project, "Technical Specification Group Radio Access Network; Physical layer procedures (FDD) (Release 5)," 3GPP TS 25.214 V5.4.0 (Mar. 2003).

Third Generation Partnership Project, "Technical Specification Group Radio Access Network; Physical channels and mapping of transport channels onto physical channels (FDD) (Release 4)," 3GPP TS 25.211 V4.4.0 (Mar. 2002).

Third Generation Partnership Project, "Technical Specification Group Radio Access Network; UE Procedures in Idle Mode and Procedures for Cell Reselection in Connected Mode (Release 4)," 3GPP TS 25.304 V4.6.0 (Dec. 2002).

(56) References Cited

OTHER PUBLICATIONS

Third Generation Partnership Project, "Technical Specification Group Radio Access Network; UE Procedures in Idle Mode and Procedures for Cell Reselection in Connected Mode (Release 4)," 3GPP TS 25.304 V4.4.0 (Mar. 2002).
Third Generation Partnership Project, "Technical Specification Group Radio Access Network; Physical channels and mapping of transport channels onto physical channels (FDD) (Release 5)," 3GPP TS 25.211 V5.0.0 (Mar. 2002).
Third Generation Partnership Project, "Technical Specification Group Radio Access Network; Physical channels and mapping of transport channels onto physical channels (FDD) (Release 5)," 3GPP TS 25.211 V5.3.0 (Dec. 2002).
Third Generation Partnership Project, "Technical Specification Group Radio Access Network; Physical channels and mapping of transport channels onto physical channels (FDD) (Release 4)," 3GPP TS 25.211 V4.6.0 (Sep. 2002).
Third Generation Partnership Project, "Technical Specification Group Radio Access Network; Physical layer procedures (FDD) (Release 1999)," 3GPP TS 25.214 V3.12.0 (Mar. 2003).
Third Generation Partnership Project, "Technical Specification Group Radio Access Network; Physical layer procedures (FDD) (Release 4)," 3GPP TS 25.214 V4.6.0 (Mar. 2003).
Third Generation Partnership Project, "Technical Specification Group Radio Access Network; UE Proceedures in Idle Mode and Procedures for Cell Reselection in Connected Mode (Release 1999)," 3GPP TS 25.304 V3.10.0 (Mar. 2002).
Third Generation Partnership Project, "Technical Specification Group Radio Access Network; UE Proceedures in Idle Mode and Procedures for Cell Reselection in Connected Mode (Release 1999)," 3GPP TS 25.304 V3.12.0 (Dec. 2002).
Third Generation Partnership Project, "Technical Specification Group Radio Access Network; Multiplexing and channel coding (FDD) (Release 1999)," 3GPP TS 25.212 V3.11.0 (Sep. 2002).
Third Generation Partnership Project, "Technical Specification Group Radio Access Network; Multiplexing and channel coding (FDD) (Release 4)," 3GPP TS 25.212 V4.6.0 (Sep. 2002).
Third Generation Partnership Project, "Technical Specification Group Radio Access Network; Multiplexing and channel coding (FDD) (Release 1999)," 3GPP TS 25.212 V3.9.0 (Mar. 2002).
Third Generation Partnership Project, "Technical Specification Group Radio Access Network; Multiplexing and channel coding (FDD) (Release 4)," 3GPP TS 25.212 V4.4.0 (Mar. 2002).
Third Generation Partnership Project, "Technical Specification Group Radio Access Network; Multiplexing and channel coding (FDD) (Release 5)," 3GPP TS 25.212 V5.0.0 (Mar. 2002).
Third Generation Partnership Project, "Technical Specification Group Radio Access Network; Multiplexing and channel coding (FDD) (Release 5)," 3GPP TS 25.212 V5.4.0 (Mar. 2003).
Third Generation Partnership Project, "Technical Specification Group Radio Access Network; Introduction of the Multimedia Broadcast Multicast Service (MBMS) in the Radio Access Network (Stage-2); (Release 6)," 3GPP TS 25.346 V1.3.0 (Jan. 2003).
Third Generation Partnership Project, "Technical Specification Group Radio Access Network; Radio Interface Protocol Architecture (Release 5)," 3GPP TS 25.301 V5.2.0 (Sep. 2002).
Third Generation Partnership Project, "Technical Specification Group Radio Access Network; Radio Interface Protocol Architecture (Release 5)," 3GPP TS 25.301 V5.0.0 (Mar. 2002).
Third Generation Partnership Project, "Technical Specification Group Radio Access Network; Radio Interface Protocol Architecture (Release 4)," 3GPP TS 25.301 V4.4.0 (Sep. 2002).
Third Generation Partnership Project, "Technical Specification Group Radio Access Network; Radio Interface Protocol Architecture (Release 1999)," 3GPP TS 25.301 V3.11.0 (Sep. 2002).
Third Generation Partnership Project, "Technical Specification Group Radio Access Network; Radio Interface Protocol Architecture (Release 1999)," 3GPP TS 25.301 V3.9.0 (Dec. 2001).
Third Generation Partnership Project, "Technical Specification Group Radio Access Network; Radio Interface Protocol Architecture (Release 4)," 3GPP TS 25.301 V4.2.0 (Dec. 2001).
Third Generation Partnership Project, "Technical Specification Group Radio Access Network; High Speed Downlink Packet Access; Overall UTRAN Description (Release 5)," 3GPP TR 25.855 V5.0.0 (Sep. 2001).
Third Generation Partnership Project, "Technical Specification Group Radio Access Network; UTRAN Iu Interface: general aspects and principles (Release 5)," 3GPP TS 25.410 V5.3.0 (Dec. 2002).
Third Generation Partnership Project, "Technical Specification Group Radio Access Network; UTRAN Iu Interface: general aspects and principles (Release 5)," 3GPP TS 25.410 V5.0.0 (Mar. 2002).
Third Generation Partnership Project, "Technical Specification Group Radio Access Network; UTRAN Iu interface data transport and transport signaling (Release 5)," 3GPP TS 25.414 V5.0.0 (Mar. 2002).
Third Generation Partnership Project, "Technical Specification Group Radio Access Network; UTRAN Iu interface data transport and transport signaling (Release 5)," 3GPP TS 25.414 V5.4.0 (Mar. 2003).
Third Generation Partnership Project, "Technical Specification Group Services and System Aspects; Multimedia Broadcast/Multicast Service (MBMS); Architecture and Functional Description (Release 6)," 3GPP TS 23.246 V.0.5.0 (Apr. 2003).
Third Generation Partnership Project, "Technical Specification Group Services and System Aspects; Security; Security of Multimedia Broadcast/Multicast Service (Release 6)," 3GPP TS 33.cde[246] V0.0.1, 3GPP TSG SA WG3 Security—S3#25, S3-020526, Munich, Germany (Oct. 8-11, 2002).
Third Generation Partnership Project, "Technical Specification Group Radio Access Network; Broadcast/Multicast Control (BMC) (Release 5)," 3GPP TS 25.324 V5.3.0 (Mar. 2003).
Third Generation Partnership Project, "Technical Specification Group Radio Access Network; Broadcast/Multicast Control BMC (Release 5)," 3GPP TS 25.324 V5.0.0 (Mar. 2002).
Third Generation Partnership Project, "Technical Specification Group Radio Access Network; Radio interface for broadcast/multicast services (Release 1999)," 3GPP TR 25.925 V3.4.0 (Mar. 2001).
Third Generation Partnership Project, "Technical Specification Group Services and System Aspects; Multimedia Broadcast/Multicast Service; Architecture and Functional Description (Release 5)," 3GPP TR 23.846 0.2.0 (Jan. 2002).
Third Generation Partnership Project, "Technical Specification Group Services and System Aspects; Multimedia Broadcast/Multicast Service; Architecture and Functional Description (Release 5)," 3GPP TR 23.846 0.3.0 (Jan. 2002).
Third Generation Partnership Project, "Technical Specification Group Services and System Aspects; Multimedia Broadcast/Multicast Service (MBMS); Architecture and functional description (Release 6)," 3GPP TR 23.846 6.1.0 (Dec. 2002).
TSG RAN WG2, "LS on CR of UE category of HSDPA," TSG-RAN Working Group 2 Meeting #29, R2-020865 Gyeongju, Korea (May 13-17, 2002).
TSG RAN WG2, "TS RAN S2.01, Radio Interface Protocol Architecture, V0.2.0," TSG-RAN Meeting #3, TSGR#3(99)259, Yokohama, Japan (Apr. 21-23, 1999).
TSG-RAN WG2, "Agreed CRs (Rel-5) for WI" High Speed Downlink Packet Access (HSDPA),: TSG-RAN Meeting #14, RP-010774, Kyoto, Japan (Dec. 11-14, 2001).

* cited by examiner

POINT TO MULTI-POINT SERVICES USING HIGH SPEED SHARED CHANNELS IN WIRELESS COMMUNICATION SYSTEMS

CROSS REFERENCE TO RELATED APPLICATIONS

This application is a continuation of U.S. patent application Ser. No. 15/207,000, filed Jul. 11, 2016, issuing as U.S. Pat. No. 10,015,775 on Jul. 3, 2018, which is a continuation of U.S. patent application Ser. No. 14/711,440, filed May 13, 2015, now abandoned, which is a continuation of U.S. patent application Ser. No. 10/426,191, filed Apr. 30, 2003, now abandoned, which claims the benefit of U.S. Provisional Application No. 60/377,036, filed on May 1, 2002, the contents of all of which are hereby incorporated by reference herein.

FIELD OF INVENTION

The invention generally relates to wireless communication systems. In particular, the invention relates to point to multi-point services in such systems.

BACKGROUND

Figure 1:
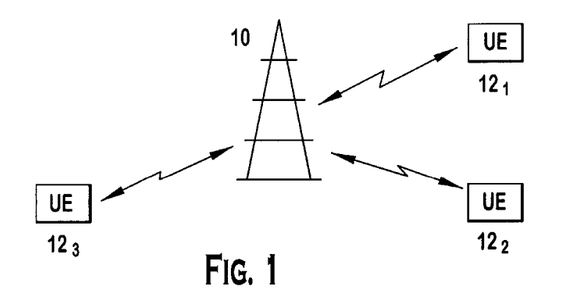
FIG. 1 is an illustration of a point to multi-point service.

There is a growing desire to use point to multi-point services in wireless communication systems. As shown in FIG. 1 in point to multi-point, one service is sent from a single point, such as a base station, to multiple points, such as user equipments. Examples of point to multi-point services are multimedia broadcasts and multicast services.

In the third generation partnership program (3GPP) proposed system, one proposed channel that could be used for such services is the forward access channel (FACH). The FACH is a downlink common transport channel (TrCH) that can be received by all users. The FACH TrCH is broadcast by applying it to the secondary common control physical channel (S-CCPCH). The S-CCPCH is transmitted to all the cell users.

To limit the radio resources allocated to the S-CCPCH, the S-CCPCH data rate is limited. To illustrate, if a high data rate service was transmitted over the S-CCPCH, it would need to be transmitted using a low data redundancy to achieve that high data rate. Since the S-CCPCH is transmitted to the entire cell, it is transmitted at a power level sufficient for reception by a user at the periphery of the cell at a desired quality of service (QOS). Broadcasting a high data rate service at this power level would increase interference to other users reducing the capacity of system, which is extremely undesirable.

Due to the broadcast nature of the S-CCPCH and FACH, the radio resources required for the S-CCPCH and FACH are rather static. The modulation and coding set (MCS) and transmission power level used by the S-CCPCH needs to be sufficient to maintain a desired QOS at the periphery of the cell.

A shared channel proposed for use in the 3GPP system is the high speed downlink shared channel (HS-DSCH). The HS-DSCHs are high speed channels which are time shared by the cell users (user equipments). Each transmission is targeted to a separate user and each user's transmission over the HS-DSCH is separated by time.

The HS-DSCH transmissions to a user are associated with an uplink and a downlink dedicated control channels. Each user sends measurements via layer 1 and layer 3 signaling in the uplink control channel. Using these measurements, a modulation and coding set (MCS) is selected for that user's transmissions. The MCS can be changed every 2 to 10 milliseconds. By carefully selecting the MCS for the user transmissions, the least robust (lowest data redundancy) MCS can be selected to maintain the desired quality of service (QOS). As a result, the radio resources are more efficiently utilized.

To determine when a particular user's transmission is being sent over the HS-DSCH, that user first searches on the set of downlink control channel for its UE ID encoded in a cyclic redundancy code (CRC) and decodes the downlink control channel for HS-DSCH allocation information. After a predetermined period, the UE receives the HS-DSCH for a packet having its UE ID and decodes that packet for reception of user data.

Although the HS-DSCH allows for a more efficient utilization of radio resources, only point to point services can be handled by the HS-DSCH. To handle multiple reception points, multiple transmissions must be made over the HS-DSCH. Such multiple transmissions utilize a large amount of radio resources, which is undesirable.

Accordingly, it is desirable to have a flexible mechanism to provide point to multi-point services.

SUMMARY

Service data is transferred in a wireless communication system. A first service identification is transmitted for reception by a group of users of a cell in the system. The group of users does not include all of the users of the cell. Each of the group of users receives the service identification. Each of the group of users monitors for a second service identification being transmitted over a high speed downlink shared channel (HS-DSCH). The service data is transmitted over the HS-DSCH with the second service identification. Each of the group of users detects the second service identification and receives the service data of the HS-DSCH.

DETAILED DESCRIPTION OF THE PREFERRED EMBODIMENT(S)

Although the preferred embodiments are described in conjunction with a preferred 3GPP proposed system, they can be utilized with other wireless systems using point to multi-point transmissions.

Figure 2:
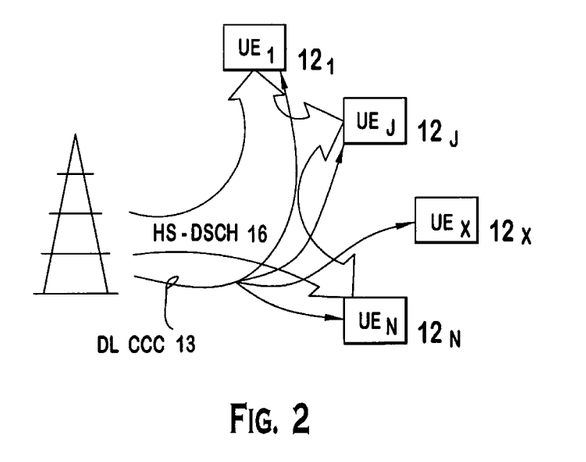
FIG. 2 are illustrations of a preferred HS-DSCH and associated control channels.

FIG. 2 is an illustration of a preferred HS-DSCH 16 and its associated downlink control channel(s) 13 for use in transmitting a point to multi-point (PtM service. In FIG. 2, a group of users, UE 1 $12_1$, ..., UE J $12_J$, ..., UE N $12_N$, are to receive the service over the HS-DSCH 16. A downlink common control channel (CCC) 13 is utilized to allocate the HS-DSCH 16 for the users, UE 1 12$_1$, ..., UEJ 12$_J$, ..., UE N 12$_N$. The HS-DSCH 16 is sent by a base station 10 and is received by the group of UEs 12$_1$-12$_N$. UEs, such as UE X 12$_x$, not registered for the service do not match the service identifier on the CCC 13. Therefore, this UE, UE X 12$_x$, is not configured to receive data of the HS-DSCH 16.

Figure 3:
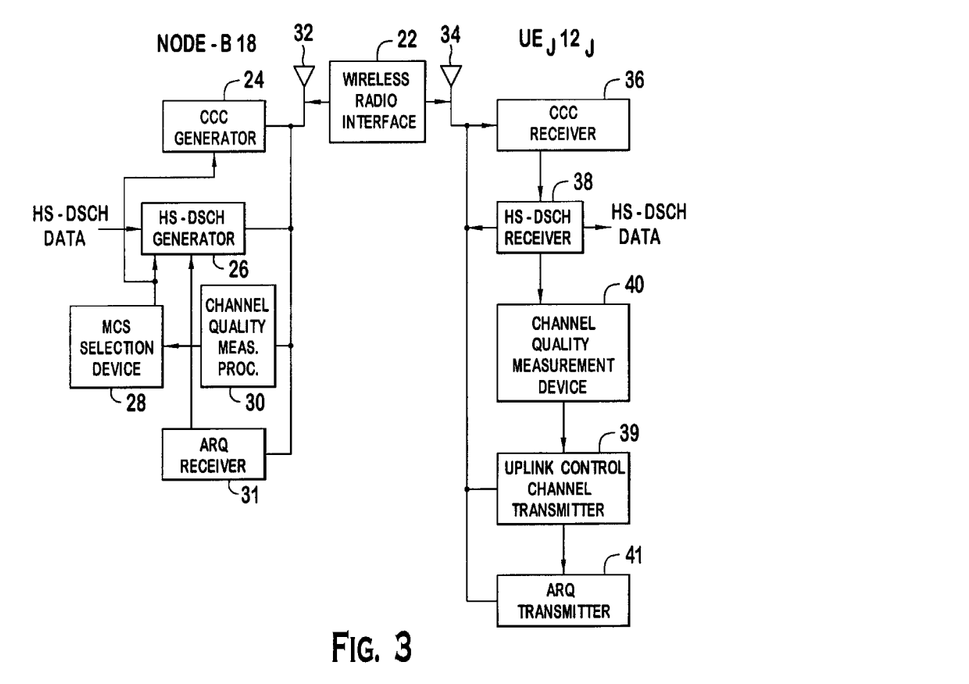
FIG. 3 is simplified diagram of a preferred Node-B and user equipment.

FIG. 3 is a simplified diagram of a Node-B 18 and one of the UEs, UE J 12$_J$, for use in transferring data over the HS-DSCH 16. At the Node-B 18, a downlink control channel generator 24 produces the CCC signal for each UE 12$_1$-12$_N$. For a UE J 12$_J$, after the CCC 13 is radiated by an antenna 32 or antenna array through the wireless radio interface 22, it is received by an antenna 34 or an antenna array of the UE J 12$_J$ and processed by a CCC receiver 36 to recover control information of the channel, such as a modulation and coding set of the HS-DSCH 16.

A HS-DSCH generator 26 produces the HS-DSCH signal for transfer through the wireless interface 22. The HS-DSCH signal is received by the UE J 12$_J$ using its antenna 34 or antenna array. Information of the HS-DSCH 16 is recovered using the CCC information by a HS-DSCH receiver 38. A channel quality measuring device 40 takes channel quality measurements/information of the HS-DSCH, such as the signal to interference ratio (SIR) or block error rate (BLER). Channel quality can also be derived from the downlink associated dedicated channel. The measurements/information is sent to the Node-B 18, by an uplink physical control channel (UCC) transmitter, or by layer 3 signaling procedures.

Additionally, an automatic repeat request (ARQ) transmitter 41 at the user equipment 12 transmits acknowledgments (ACKs) and negative ACKs (NAKs) indicating whether the HS-DSCH information was received successfully. A ARQ receiver 31 at receives the ACK and NAKS. If a NAK is received by any of the HS-DSCH transmission users, the HS-DSCH transmission is typically repeated. The Node-B 18 checks the ACKs/NAKs for all users. Typically, if any user sends a NAK, a retransmission is made. However, a retransmission may only be triggered if only a number of NAKs exceeding a threshold is met. Typically, time limits are set for retransmissions. Preferably, the UEs 12 ACKing ignore subsequent retransmissions saving their power.

A channel quality measurement processor 30, at the Node-B 18, recovers the channel quality measurements/information from all the users of the HS-DSCH. A modulation and coding set (MCS) selection device 28 uses the channel measurements/information from each of the users registered to receive the PtM service (user group) to select a MCS for the HS-DSCH transmission. Preferably, the selected MCS is the least robust (highest data rate) that the channel conditions permit for the user within this PtM user group having the poorest received measured HS-DSCH signal quality. Preferably, the MCS is updated every transmission time interval (TTI), although a longer time period can be used. The CCC generator 24 produces the CCC indicating the selected MCS to UE 1 12$_1$, ..., UE J 12$_J$, ..., UE N 12$_N$ for proper reception of the HS-DSCH. The HS-DSCH generator 26 produces the HS-DSCH 16 using the selected MCS.

For services having multiple sub-streams of data, the transmission characteristics of the various sub-streams may be handled separately. To illustrate, a multimedia service may have an audio, video and text sub-streams. The QOS of each sub-stream may differ allowing different transmission attributes to be used by each sub-stream. This approach allows for better resource efficiency. Instead of transmitting each sub-stream to meet the highest QOS sub-stream requirements, they can be handled separately. The block error rate (BLER) is compared to a BLER quality target for each sub-stream.

Figure 4:
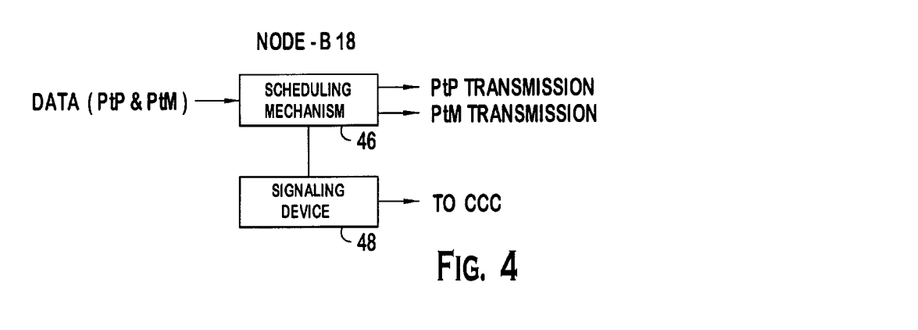
FIG. 4 is a simplified diagram of a preferred Node-B with a scheduling mechanism for the preferred HS-DSCH.

FIG. 4 is a simplified block diagram of a preferred scheduling mechanism for the Node-B 18. The scheduling mechanism 46 is preferably used to schedule data every TTI, although a longer scheduling period may be used. The scheduling mechanism 46 receives point to point (PtP) and PtM data to be transmitted over the HS-DSCH. The scheduler is determining which users will receive PtP transmissions and which user groups will receive PtM transmissions in the next TTI.

Scheduling the transfer of data over the preferred time period allows for a more efficient utilization of radio resources. To illustrate, in a particular TTI little data may be available for dedicated PtP transmissions. The scheduling mechanism 46 may increase the amount of PtM data transmitted through the HS-DSCH channel due to the increased availability of the radio resources in that TTI. Similarly, the scheduler 46 may choose to transmit PtP services when PtM data is not available. Another scheduling criteria is QoS attributes, such as transmission latency and/or data throughput requirements of the PtP or PtM service. Scheduling on a TTI basis offers a greater ability to achieve these requirements while maintaining high utilization of HS-DSCH cell resources.

The scheduler 46 may also take into account physical transmission requirements. For example, one user or user group may require a more robust MCS than another. During the next TTI resources may only be available for a less robust MCS. The scheduler 46 may then schedule transmissions for PtP users or PtM user groups that maximize the use of available resources. Since data available for transmission with specific QOS requirements, available physical resources and channel quality measurements change on a TTI basis, the ability to schedule within this interval improves the number of satisfied users and the overall utilization and efficient use of physical resources.

The scheduler 46 also gets ACK/NAK feedback from all users in the PtM user group and schedules retransmissions until all users indicate successful reception of the transmission by sending a ACK, or a certain configured threshold is reached, or a service transmission time limit is reached or a retransmission limit is reached. The advantage of this approach is that only segments of a PtM service that are in error are retransmitted, rather than retransmitting the entire service transmission. Preferably, users that have previously generated an ACK will ignore any retransmissions.

A benefit of this approach is the ability to dynamically schedule on a TTI basis between PtP and PtM services rather than scheduling S-CCPCH with layer 3 procedures that require the order of 100s of ms to seconds for channel allocations. This offers improved QOS and physical resource management. Additionally, it allows the UE to receive multiple services without the capability for reception of simultaneous channels, since overlapping physical allocations can be avoided. The multiple services are separated by time.

The Node-B 18 signals on the CCC 13 to the UEs 12$_1$-12$_N$ the channel configuration that data for UE 12$_1$-12$_N$ will be sent. The preferred scheduling for each TTI reduces resource conflicts between services, by maximizing use of radio resources. This assignment of channels is signaled to the users via the downlink CCC using a signaling device 48.

Without the mechanism 46, the channels typically cannot be reallocated on a TTI granularity and as a consequence the ability to maintain QOS with high utilization and efficient use of physical resources is restricted.

Figure 5A:
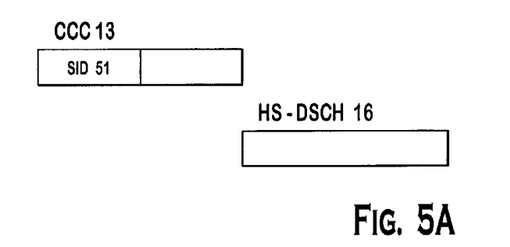
FIGS. 5A and 5B are illustrations of preferred HS-DSCH signaling for the HS-DSCH.
Figure 5B:
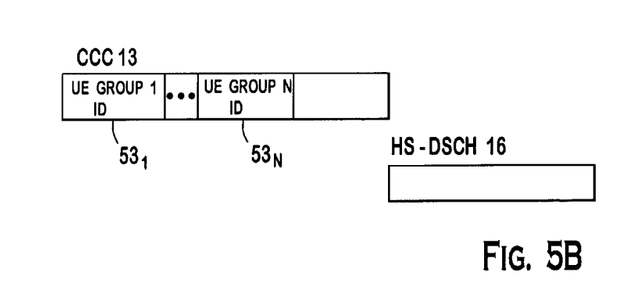

FIGS. 5A and 5B are illustrations of preferred HS-DSCH signaling for the HS-DSCH 16. In FIG. 5A, each UE 12$_1$-12$_N$ of the PtM user group is notified of the service transmission by detecting a PtM service ID 51 associated with all users of the service. That service ID 51 is encoded on the downlink common control channel 13. After a predetermined time period, the users receive the HS-DSCH of the authorized service.

In FIG. 5B, each UE 12$_1$-12$_N$ is notified of the service transmission by detecting an ID associated with its group of UEs, UE group ID 1 53$_1$ to UE group ID N 53$_N$, encoded on the downlink common control channel 13. After a predetermined time period, the users receive the HS-DSCH 16 indicated by the CCC 13 for a packet having a service ID of the authorized service.

Figure 6:
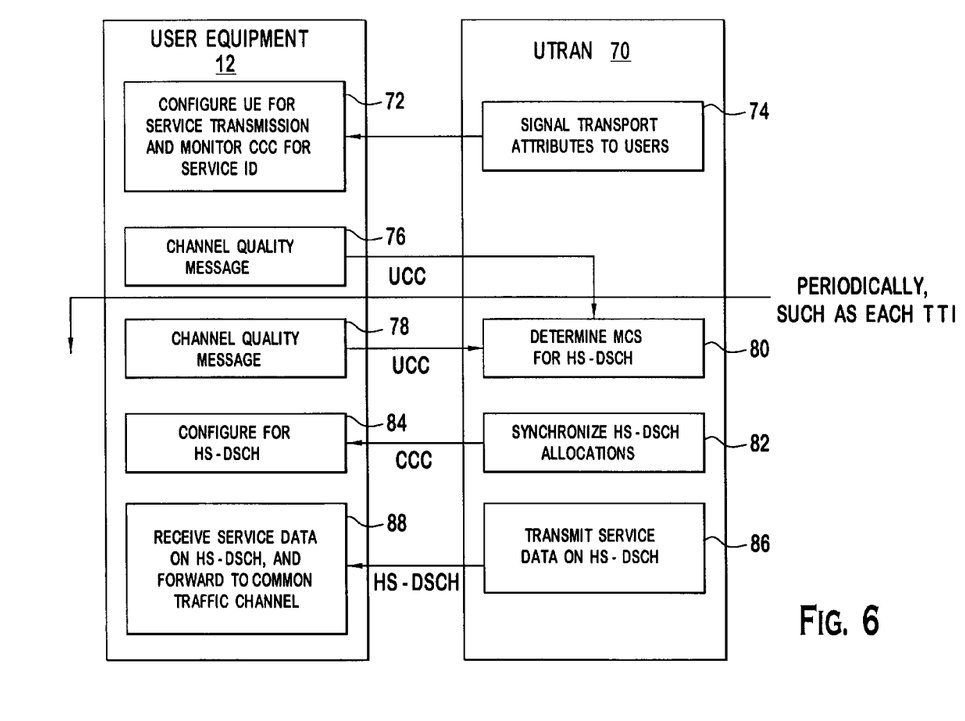
FIG. 6 is an illustration of preferred signals for establishment and transmission of a point to multi-point service over a HS-DSCH.

FIG. 6 is an illustration of preferred signals for establishment and transmissions of a point to multi-point service over HS-DSCHs. The RAN 70 signals to each user to receive the service the transport attributes of the transmission, 74. Each user configures itself for reception of the transmission and monitors the CCCs for the PtM service group ID, 72. Data to be sent for the point to multi-point service is received from the core network by the UMTS radio access network (UTRAN) 70. The service/group/UE ID on the CCC indicates that the HS-DSCH transmission will occur shortly, after a specified time period on a specified HS-DSCH physical channel. Upon reception of the CCC each user configures itself for reception of the HS-DSCH transmission.

Each user may send channel quality information to the RAN 70 with layer 3 signaling procedures, 76. The sending of the channel information is also reported on a TTI basis by physical layer signaling, 78. Using the channel quality information for all the users within each PtM user group, the RAN 70 determines appropriate MCS of HS-DSCH transmissions to each PtM user group. To illustrate, the RAN 70 would typically set the MCS at a level for reception at a desired QOS by the user having the worst reception quality. To optimize the usage of radio resources, these parameters are preferably updated every time transmission interval (TTI), although a longer time period between updates may be used.

The UTRAN 70 synchronizes the HS-DSCH allocations, 82, and each UE 12 configures the HS-DSCH reception, 84. Service data is transmitted on the HS-DSCH, 86. The service data transmitted on the HS-DSCH is received by the UE 12. After verification, the service data is forwarded to the common traffic channel. The preferred architecture allows for the flexibility for transferring common traffic channel data over shared or dedicated channels as PtM or PtP transmission. This mapping is performed for both on the transmission and reception side of the wireless interface.

Figure 7:
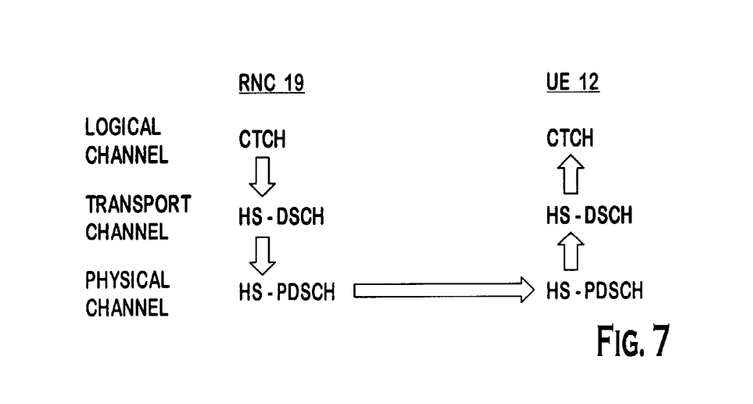
FIG. 7 is an illustration of channel mapping performed by the radio network controller and the user equipment for a point to multi-point service over a HS-DSCH.

FIG. 7 is an illustration of the preferred channel mapping at a radio network controller 19 and UE 12. PtM data arrives at the RNC on a common traffic channel (CTCH). The CTCH is mapped onto the HS-DSCH for transfer to the user over the physical channel, HS-PDSCH. A UE 12 as illustrated here and typically multiple UEs receive the HS-DSCH transmission. UE 12 receives the HS-PDSCH and maps the HS-DSCH to the CTCH for processing by the UE 12.

What is claimed is:

1. A method for use in wireless communications, the method comprising:

selectively transmitting on a control channel, on a time interval basis, point to multipoint (PtM) control information or point to point (PtP) control information;

wherein on a condition that PtM control information is transmitted, the PtM control information is transmitted using a PtM service identification to PtM users and includes a modulation and coding scheme (MCS) for PtM data, the PtM service identification indicating that the PtM users are to receive the PtM data in a first time interval, and the PtM data is transmitted in the first time interval to the PtM users; and wherein on a condition that PtP control information is transmitted, the PtP control information is transmitted using a user equipment identification (UE ID) of a single user, and PtP data is transmitted in a second time interval to the single user on a shared channel that shares resources with the PtM data.

2. The method of claim 1, wherein the UE ID is combined with a cyclic redundancy check.

3. The method of claim 1, wherein the PtM data comprises multimedia data.

4. A base station for use in wireless a transmitter coupled to an antenna;

the transmitter and the antenna configured to selectively transmit on a control channel, on a time interval basis, point to multipoint (PtM) control information or point to point (PtP) control information;

the transmitter and the antenna configured to, on a condition that PtM control information is transmitted, transmit the PtM control information which includes a modulation and coding scheme (MCS) for PtM data using a PtM service identification to a group of PtM users, the PtM service identification indicating that the PtM users are to receive the PtM data in a first time interval, and to transmit the PtM data in the first time interval to the group of PtM users; and the transmitter and the antenna configured to, on a condition that PtP control information is transmitted, transmit the PtP control information using a user equipment identification (UE ID) of a single user and to transmit PtP data in a second time interval to the single user on a shared channel that shares resources with the PtM data.

5. The base station of claim 4, wherein the UE ID is combined with a cyclic redundancy check (CRC).

6. The base station of claim 4, wherein the PtM data comprises multimedia data.

7. A wireless transmit/receive unit (WTRU) for use in wireless communications, the WTRU comprising:

a receiver coupled to an antenna;

the receiver and the antenna configured to receive a signal including control information on a control channel, wherein the control information comprises point- to-multipoint (PtM) control information or point to point (PtP) control information;

the receiver and the antenna further configured to, on a condition that the signal includes the PtM control information, which includes a PtM service identification of a group of PtM users that includes the WTRU, the PtM control information including a modulation and coding scheme (MCS) for PtM data, receive the PtM data in a first time interval; and the receiver and the antenna further configured to, on a condition that the signal includes the PtP control information, which includes a user equipment identification (UE ID) of the WTRU, receive PtP data in a second [[TTI]] time interval on a shared channel that shares resources with the PtM data; and wherein the PtM control information includes a modulation and coding ccheme (MCS) of the PtM data.

8. The WTRU of claim 7, wherein the UE ID is combined with a cyclic redundancy check (CRC).

9. The WTRU of claim 7, wherein the PtM data comprises multimedia data.

10. A method for use in a wireless transmit/receive unit (WTRU), the method comprising:

receiving a signal including control information on a control channel, wherein the control information comprises point-to-multipoint (PtM) control information or point to point (PtP) control information;

wherein on a condition that the signal includes the PtM control information which includes a PtM service identification of a group of PtM users that includes the WTRU, the PtM control information including a modulation and coding scheme (MCS) for PtM data, the PtM data is received in a first time interval; and wherein on a condition that the signal includes the PtP control information which includes a user equipment identification (UE ID) of the WTRU, PtP data is received in a second time interval on a shared channel that shares resources with the PtM data.

11. The method of claim 10, wherein the UE ID is combined with a cyclic redundancy check (CRC).

12. The method of claim 10, wherein the PtM data comprises multimedia data.

\* \* \* \* \*